United States Patent
Lacaze et al.

(10) Patent No.: US 10,632,850 B2
(45) Date of Patent: Apr. 28, 2020

(54) ENERGY HARVESTER WHILE IN TOW

(71) Applicants: Alberto Daniel Lacaze, Potomac, MD (US); Karl Nicholas Murphy, Rockville, MD (US)

(72) Inventors: Alberto Daniel Lacaze, Potomac, MD (US); Karl Nicholas Murphy, Rockville, MD (US)

( * ) Notice: Subject to any disclaimer, the term of this patent is extended or adjusted under 35 U.S.C. 154(b) by 192 days.

(21) Appl. No.: 15/905,513

(22) Filed: Feb. 26, 2018

(65) Prior Publication Data

US 2018/0312066 A1 Nov. 1, 2018

Related U.S. Application Data

(60) Provisional application No. 62/490,425, filed on Apr. 26, 2017.

(51) Int. Cl.
| | | |
|---|---|---|
| B60L 7/18 | (2006.01) | |
| B60T 7/20 | (2006.01) | |
| B60T 8/1761 | (2006.01) | |
| B60T 7/04 | (2006.01) | |
| F16D 61/00 | (2006.01) | |
| B60L 58/13 | (2019.01) | |
| B60T 8/17 | (2006.01) | |
| B60T 1/10 | (2006.01) | |

(52) U.S. Cl.
CPC ............... B60L 7/18 (2013.01); B60L 58/13 (2019.02); B60T 1/10 (2013.01); B60T 7/042 (2013.01); B60T 7/20 (2013.01); B60T 8/1708 (2013.01); B60T 8/1761 (2013.01); F16D 61/00 (2013.01); B60L 2200/28 (2013.01); B60T 2210/14 (2013.01); B60T 2210/36 (2013.01); B60T 2220/04 (2013.01); B60T 2270/60 (2013.01); B60T 2270/604 (2013.01)

(58) Field of Classification Search
CPC ... B60L 7/18; B60L 58/13; B60T 7/20; B60T 7/042; B60T 8/1708; F16D 61/00
USPC ...................................................... 701/22, 70
See application file for complete search history.

(56) References Cited

U.S. PATENT DOCUMENTS

| | | | | |
|---|---|---|---|---|
| 6,516,925 B1 * | 2/2003 | Napier | ...................... | B60T 1/10 188/112 A |
| 2002/0030405 A1* | 3/2002 | Harner | ...................... | B60T 7/20 303/123 |
| 2004/0217575 A1* | 11/2004 | Beaujot | ................ | A01B 69/004 280/442 |
| 2010/0252339 A1* | 10/2010 | Bibeau | ...................... | B60K 6/26 180/12 |

(Continued)

FOREIGN PATENT DOCUMENTS

| | | |
|---|---|---|
| GB | 1404809 | 3/2014 |
| KR | 20180006940 A | 1/2018 |
| WO | 2019032217 | 2/2019 |

*Primary Examiner* — Tan Q Nguyen
(74) *Attorney, Agent, or Firm* — Radha Narayanan

(57) ABSTRACT

The invention being presented uses the motors already included in an electric vehicle to charge its batteries while in tow. The charging process provided by the invention is compatible with the charging speed of current battery technology. It will provide an effective way of charging vehicles in theater, when other sources of electrical energy may not be available.

Moreover, the proposed system can actually extend the brake life of the towing vehicle and improve performance boundaries of the overall system.

25 Claims, 4 Drawing Sheets

(56) References Cited

U.S. PATENT DOCUMENTS

| | | | |
|---|---|---|---|
| 2010/0332049 A1* | 12/2010 | Sy | B60T 8/1708 701/1 |
| 2011/0042154 A1* | 2/2011 | Bartel | B60L 7/10 180/11 |
| 2012/0250456 A1 | 10/2012 | Tenghamn | |
| 2013/0266380 A1 | 10/2013 | Capron et al. | |

* cited by examiner

Discharging the batteries to generate torque and actually aid the "towing vehicle." In other words, there is no reason why the minimum regenerative effort must be zero. The same set of sensors, battery, and motor in the towed vehicle can actually push the front "towing vehicle," though of course, draining its own battery.
401

By allowing the electric vehicle in tow to use its battery electric power train to push the tower, the performance of the towing vehicle can actually be increased.
402

The vehicle being towed is a ground electric vehicle, the invention can also be used with other transportation modalities.
403

A boat being towed by another boat or tug, may have its generator connected to a propeller, both harvesting energy from the water or the air.
404

A sonobuoy (fish) being towed under water by a helicopter can harvest energy using a propeller.
405

An electric caboose can generate energy from a rail wheel as its being towed by a diesel locomotive.
406

Fig. 4

ENERGY HARVESTER WHILE IN TOW

CROSS REFERENCE TO RELATED APPLICATION

This application claims priority from U.S. Patent Application Ser. No. 62/490,425, entitled "Energy Harvester While in Tow", filed on Apr. 26, 2018. The benefit under 35 USC § 119(e) of the United States provisional application is hereby claimed, and the aforementioned application is hereby incorporated herein by reference.

TECHNICAL FIELD OF THE INVENTION

The present invention relates generally to electric and hybrid vehicles. More specifically, the present invention relates to electric and hybrid vehicles used in a towing capacity.

BACKGROUND OF THE INVENTION

The Department of Defense is considering a transition to electric vehicles, in order to increase fuel efficiency and reduce the logistic tail. As these electric vehicles are deployed, many of them will need to be towed. The towing process provides a unique opportunity to use the electric motors in the vehicle to automatically charge the vehicle in tow.

Many electric and hybrid vehicles currently use technology called regenerative braking. In this method, the electric motor is used as a generator when decelerating, transforming the kinetic energy of the vehicle into electricity that is used for charging the batteries when braking or slowing down. One of the problems with regenerative braking is that the batteries usually have a charge rate that is significantly lower than the discharge rate. However, most vehicles can decelerate faster than they can accelerate.

Therefore, there is usually a significant amount of energy lost in the regenerative process, as the batteries cannot consume the amount of energy provided by the motor/generator when aggressive braking is needed. This excess energy is therefore usually dissipated as heat like in traditional disc or drum brakes commonly used by the automotive industry.

Regenerative braking technology can be performed by the primary electric motors of the electric vehicle, or by a secondary motor connected to the drive train similar to an alternator. If the regenerative braking is performed by the main electric motors of the electric vehicle, the amount of current generated can be significant, and possibly even exceed the charging rate of the batteries.

SUMMARY OF THE INVENTION

The invention being presented uses the motors already included in an electric vehicle to charge its batteries while in tow. The charging process provided by the invention is compatible with the charging speed of current battery technology. It will provide an effective way of charging vehicles in theater, when other sources of electrical energy may not be available. Moreover, the proposed system can actually extend the brake life of the towing vehicle and improve performance boundaries of the overall system.

The current invention may utilize knowledge about fuel efficiency of the towing vehicle to optimize charging efficiency and minimize overall fuel consumption (in comparison with passive towers). Towing in theater is usually undesirable because it affects the performance parameters of the towing vehicle. By intelligently utilizing regenerative braking/charging, an intelligent tow vehicle can actually improve the performance of the smart towing versus passive towing.

BRIEF DESCRIPTION OF THE DRAWINGS

FIG. 4 illustrates how the system taught b the present invention can be utilized in the opposite way: discharging the batteries to generate torque and actually aid the "towing vehicle."

DETAILED DESCRIPTION OF THE INVENTION

Figure 1:
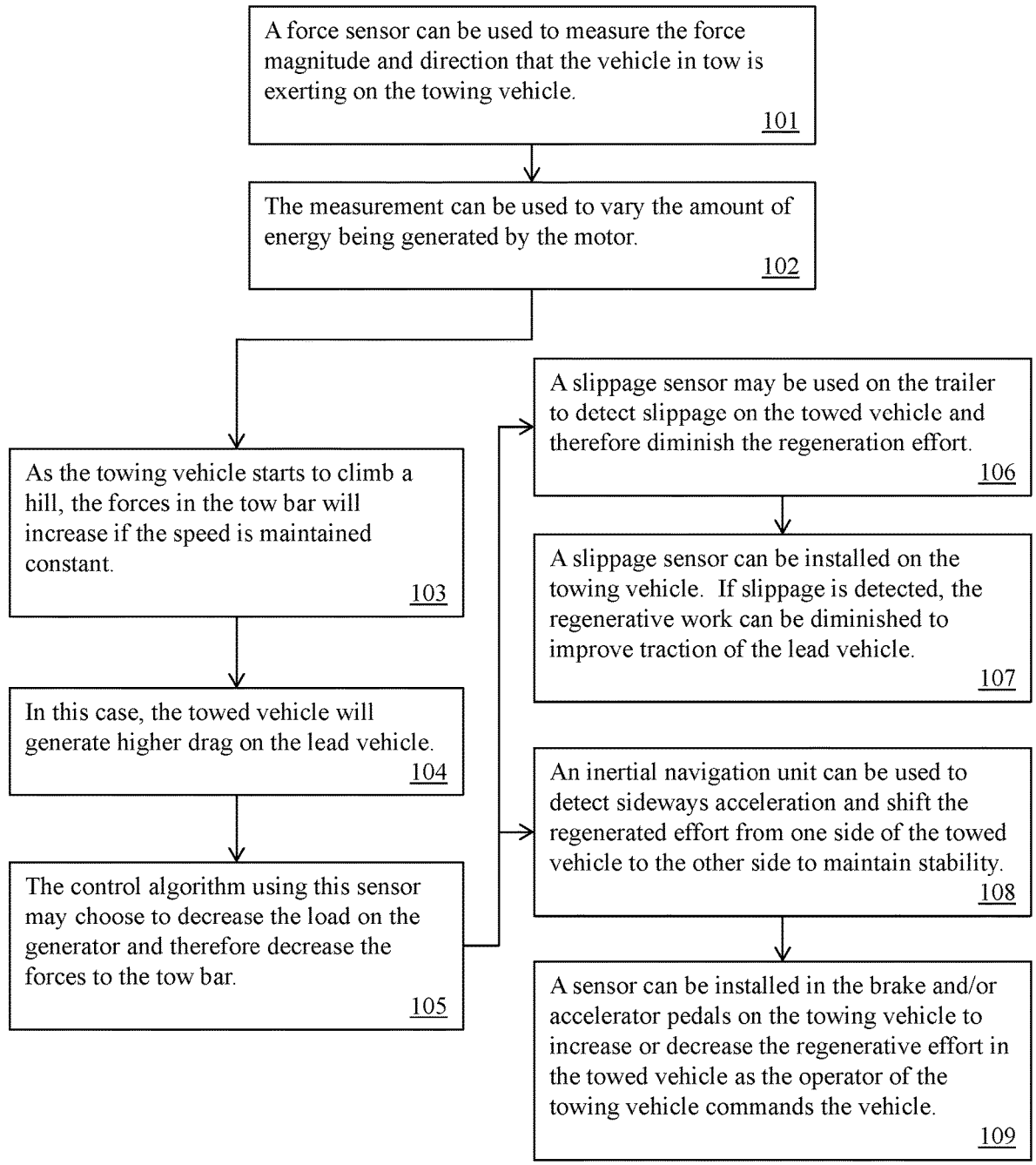
FIG. 1 is a chart detailing a variety of sensors that can be used to improve the performance of the system described.
Figure 2:
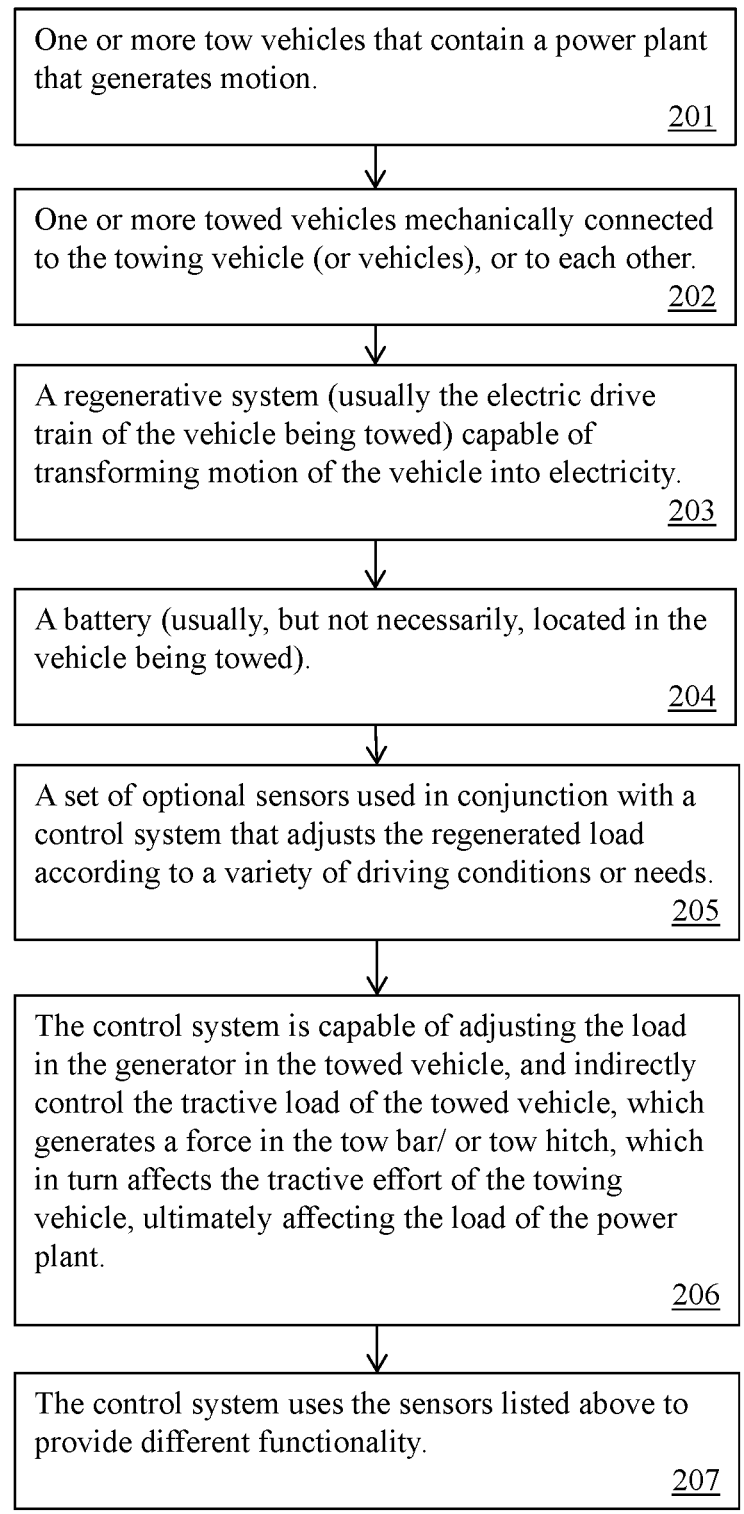
FIG. 2 is an overall system diagram of the present invention.
Figure 3:
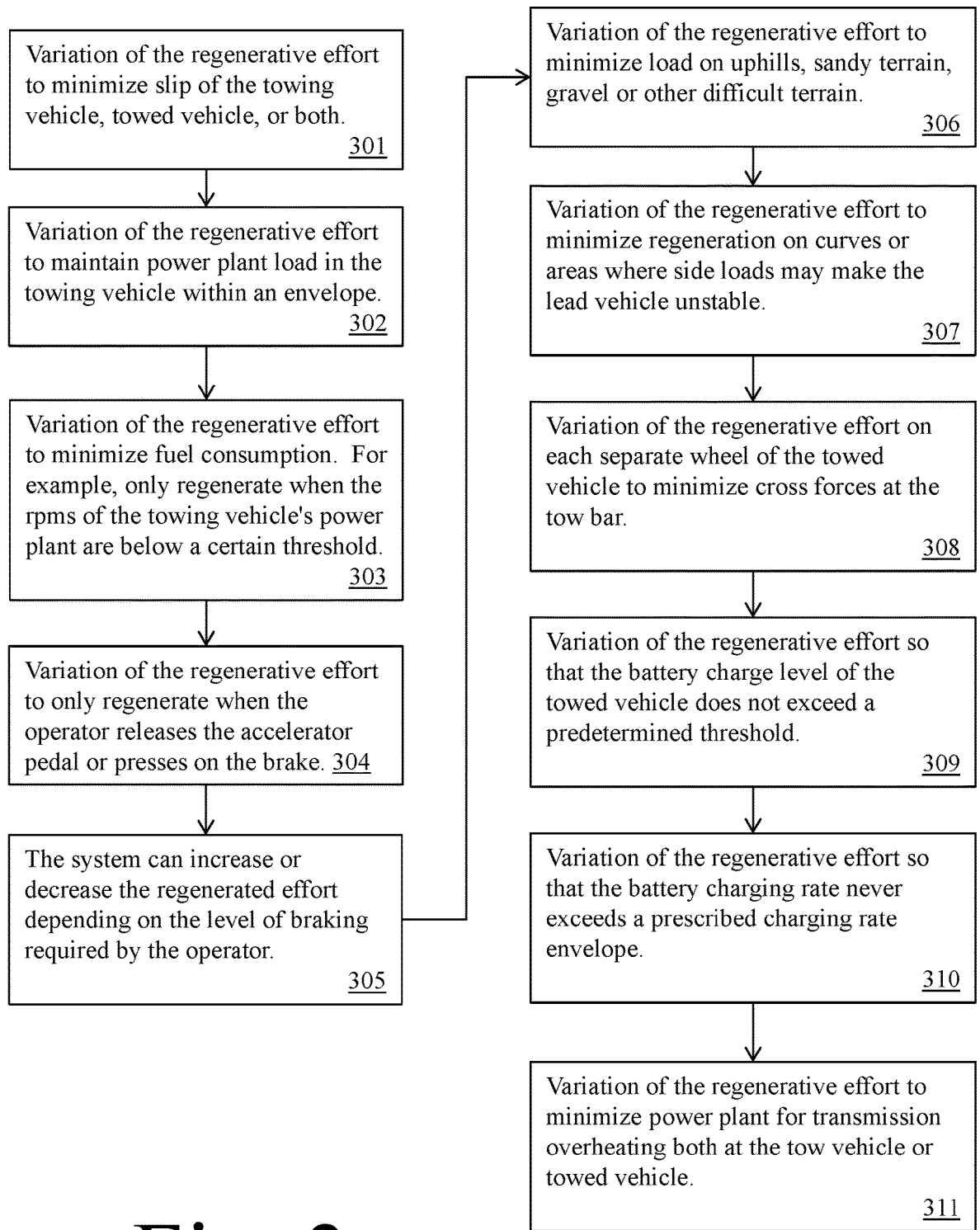
FIG. 3 is a list that includes some of the functions provided by the present invention.

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

In the invention presented in this patent, the electric vehicle in tow uses its motors to charge its batteries. The technology shares some similarities with regenerative braking. However, in this case, the tow vehicle is technically not braking. It is just controlling the force applied to the tow bar to generate the charging current that is compatible with the desired charge rate and capabilities of the power plant of the towing vehicle. There is a variety of sensors that can be used to improve the performance of the system described:

A force sensor can be used to measure the force magnitude and direction that the vehicle in tow is exerting on the towing vehicle 101. This measurement can be used to vary the amount of energy being generated by the motor 102. This could be very important in terrain with low tractive forces.

For example, as the towing vehicle starts to climb a hill, the forces in the tow bar will increase if the speed is maintained constant 103. In this case, the towed vehicle will generate higher drag on the lead vehicle 104. The control algorithm using this sensor may choose to decrease the load on the generator and therefore decrease the forces to the tow bar 105.

A slippage sensor may be used on the trailer to detect slippage on the towed vehicle and therefore diminish the regeneration effort 106. A slippage sensor can be installed on the towing vehicle. If slippage is detected, the regenerative work can be diminished to improve traction of the lead vehicle 107.

An inertial navigation unit can be used to detect sideways acceleration and shift the regenerated effort from one side of the towed vehicle to the other side to maintain stability 108.

A sensor can be installed in the brake and/or accelerator pedals on the towing vehicle to increase or decrease the regenerative effort in the towed vehicle as the operator of the towing vehicle commands the vehicle 109.

As opposed to installing new sensors on the vehicles, the control mechanism CAN or other intra-vehicle messaging systems to obtain the same information as provided by these sensors from the vehicle itself.

Overall System Diagram

The current invention is composed of the following:

One or more tow vehicles that contain a power plant that generates motion 201. One or more towed vehicles mechanically connected to the towing vehicle (or vehicles), or to each other 202.

A regenerative system (usually the electric drive train of the vehicle being towed) capable of transforming motion of the vehicle into electricity 203.

A battery (usually, but not necessarily, located in the vehicle being towed) 204.

A set of optional sensors used in conjunction with a control system that adjusts the regenerated load according to a variety of driving conditions or needs 205.

The control system is capable of adjusting the load in the generator in the towed vehicle, and indirectly control the tractive load of the towed vehicle, which generates a force in the tow bar/or tow hitch, which in turn affects the tractive effort of the towing vehicle, ultimately affecting the load of the power plant 206. The control system uses the sensors listed above to provide different functionality 207.

The following list includes some of the functions provided by the current invention:

Variation of the regenerative effort to minimize slip of the towing vehicle, towed vehicle, or both 301.

Variation of the regenerative effort to maintain power plant load in the towing vehicle within an envelope 302.

Variation of the regenerative effort to minimize fuel consumption. For example, only regenerate when the rpms of the towing vehicle's power plant are below a certain threshold 303.

Variation of the regenerative effort to only regenerate when the operator releases the accelerator pedal or presses on the brake 304. The system can increase or decrease the regenerated effort depending on the level of braking required by the operator 305.

Variation of the regenerative effort to minimize load on uphills, sandy terrain, gravel or other difficult terrain 306.

Variation of the regenerative effort to minimize regeneration on curves or areas where side loads may make the lead vehicle unstable 307.

Variation of the regenerative effort on each separate wheel of the towed vehicle to minimize cross forces at the tow bar 308.

Variation of the regenerative effort so that the battery charge level of the towed vehicle does not exceed a predetermined threshold 309.

Variation of the regenerative effort so that the battery charging rate never exceeds a prescribed charging rate envelope 310.

Variation of the regenerative effort to minimize power plant for transmission overheating both at the tow vehicle or towed vehicle 311.

Although until now, we have specifically addressed the issue of regeneration of energy, the system can be utilized in the opposite way: discharging the batteries to generate torque and actually aid the "towing vehicle." In other words, there is no reason why the minimum regenerative effort must be zero. The same set of sensors, battery, and motor in the towed vehicle can actually push the front "towing vehicle," though of course, draining its own battery 401.

As mentioned earlier, deployed truck drivers usually prefer not to tow. This is because a passive towed vehicle tends to decrease the performance at envelope of the tower. By allowing the electric vehicle in tow to use its battery electric power train to push the tower, the performance of the towing vehicle can actually be increased 402.

Although the previous description assumes that the towing vehicle is a ground vehicle, and the vehicle being towed is a ground electric vehicle, the invention can also be used with other transportation modalities 403.

For example, a boat being towed by another boat or tug, may have its generator connected to a propeller, both harvesting energy from the water or the air 404. A sonobuoy (fish) being towed under water by a helicopter can harvest energy using a propeller 405. An electric caboose can generate energy from a rail wheel as its being towed by a diesel locomotive 406. The German, World War II cyclocopters were towed by u-boat submarines.

The presented invention transcends the mode of transportation. Therefore, both the tower and the vehicle in tow can be either or ground, air, surface, or underwater vehicles, or a combination of them.

The intelligent charging system for vehicles in tow of the present comprises a tow vehicle; a vehicle in tow; a mechanical connection from the towed vehicle to the in towed vehicle that can apply forces from one vehicle to another; a motor/generator on the towed vehicle; a battery on the towed vehicle; and a control system capable of controlling the amount of electrical power being generated by the generator/motor.

The physical embodiment of the present invention includes ne or more slip sensors in the towed/or towing vehicle to measure slip and provide these measurements to the control system. A sensor to measure tractive effort on one or more of the wheels of the towing vehicle or the towed vehicle, and providing this information to the control system. One or more sensors that can measure the force applied through the mechanical connection between the tower and the towed are utilized by the present invention. An inertial sensor, either at the tower or towed vehicle, and this information is provided to the control system.

The system can also incorporate additional physical components such as one or sensors measuring a brake pedal and an acceleration pedal, for providing this information to the control system. A CAN or other intra-vehicle communication system is used to collect information on the sensors.

The control system adjusts the variation of the regenerative effort to minimize slip of the towing vehicle, towed vehicle, or both as detailed previously.

In alternative embodiments, there may be two or more towing vehicles or two or more towed vehicles. The towing vehicle may be a ground vehicle, or an aerial vehicle, or a surface vehicle, or an underwater vehicle and the towed vehicle is either ground vehicle, aerial vehicle, surface vehicle, or underwater vehicle or any combination.

Instead of having a battery, the vehicle in tow has some other energy storage or energy usage element (e.g.—fly wheel, etc).

When a generator is used, the generator has a motor to drain the battery and provide force to the towing vehicle.

In an alternative embodiment, the vehicle with the power plant is behind the vehicle harvesting energy and charging.

In an alternative embodiment, a method for metering the amount of energy being transferred is incorporated.

In an alternative embodiment, the energy is harvested by the vehicle in tow, is shared by the rest of the vehicles attached to each other and the vehicle in tow might charge a battery of the towing vehicle.

In an alternative embodiment a GPS sensor or other localization mechanism is used to tell the control system of upcoming slopes and the control mechanism adjusts the regenerative effort of the vehicle in tow.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. An intelligent charging system for vehicles in tow, comprising: a tow vehicle;
a vehicle in tow;
a mechanical connection from the towed vehicle to the in towed vehicle that can apply forces from one vehicle to another;
a motor/generator on the towed vehicle;
a battery on the towed vehicle; and
a control system capable of controlling the amount of electrical power being generated by the generator/motor in the towed vehicle.

2. The system in claim 1, further comprising
one or more slip sensors in the towed/or towing vehicle to measure slip and provide these measurements to the control system.

3. The system of claim 1, further comprising
a sensor to measure tractive effort on one or more of the wheels of the towing vehicle or the towed vehicle and providing this information to the control system.

4. The system of claim 1, further comprising
one or more sensors that can measure the force applied through the mechanical connection between the tower and the towed.

5. The system of claim 1, further comprising
an inertial sensor, either at the tower or towed vehicle, and this information is provided to the control system.

6. The system of claim 1,
further comprising a sensor,
a brake pedal;
an acceleration pedal; and
providing this information to the control system.

7. The system of claim 2, further comprising
a CAN or other intra-vehicle communication system is used to collect information on the sensors.

8. The system of claim 1, wherein
the control system adjusts the variation of the regenerative effort to minimize slip of
the towing vehicle, towed vehicle, or both.

9. The system of claim 1, wherein
the variation of the regenerative effort to maintain power plant load in the towing vehicle within an envelope.

10. The system of claim 1, wherein
the variation of the regenerative effort to minimize fuel consumption; and
regeneration occurs when the rpms of the towing vehicle's power plant are below a certain threshold.

11. The system of claim 1, wherein
the variation of the regenerative effort to only regenerate when the operator releases the accelerator pedal or presses on the brake; and
the system can increase or decrease the regenerated effort depending on the level of braking required by the operator.

12. The system of claim 1, wherein
the variation of the regenerative effort to minimize load on uphills, sandy terrain, gravel, or other terrain.

13. The system of claim 1, wherein
the variation of the regenerative effort to minimize regeneration on curves or areas where side loads may make the lead vehicle unstable.

14. The system of claim 1, wherein
the variation of the regenerative effort on each separate wheel of the towed vehicle to minimize cross forces at the tow bar.

15. The system of claim 1, wherein
the variation of the regenerative effort so that the battery charge level of the towed vehicle does not exceed a predetermined threshold.

16. The system of claim 1, wherein
the variation of the regenerative effort so that the battery charging rate never exceeds
a prescribed charging rate envelope.

17. The system of claim 1, wherein
the variation of the regenerative effort to minimize power plant for transmission overheating both at the tow vehicle or towed vehicle.

18. The systems in any one of claims 1-17, where there may be two or more towing vehicles or two or more towed vehicles.

19. The system of claim 1, wherein
the towing vehicle is a ground vehicle, or an aerial vehicle, or a surface vehicle, or an underwater vehicle; and
the towed vehicle is either ground vehicle, aerial vehicle, surface vehicle, or underwater vehicle or any combination.

20. The system of claim 1, wherein
instead of having a battery, the vehicle in tow has some other energy storage or energy usage element.

21. The system of claim 1, wherein
the generator is used, has a motor to drain the battery and provide force to the towing vehicle.

22. The system of claim 1, wherein
the vehicle with the power plant is behind the vehicle harvesting energy and charging.

23. The system of claim 1, further comprising
a method for metering the amount of energy being transferred.

24. The system of claim 1, wherein
the energy is harvested by the vehicle in tow, is shared by the rest of the vehicles attached to each other; and
the vehicle in tow might charge a battery of the towing vehicle.

25. The system of claim 1, wherein
a GPS sensor or other localization mechanism is used to tell the control system of upcoming slopes; and
the control mechanism adjusts the regenerative effort of the vehicle in tow.

* * * * *